US008005243B2

(12) United States Patent
Terada et al.

(10) Patent No.: US 8,005,243 B2
(45) Date of Patent: Aug. 23, 2011

(54) PARAMETER DISPLAY CONTROLLER FOR AN ACOUSTIC SIGNAL PROCESSING APPARATUS

(75) Inventors: Kotaro Terada, Hamamatsu (JP); Mitsuhiko Ota, Hamamatsu (JP)

(73) Assignee: Yamaha Corporation, Hamamatsu-shi (JP)

( * ) Notice: Subject to any disclaimer, the term of this patent is extended or adjusted under 35 U.S.C. 154(b) by 813 days.

(21) Appl. No.: 10/778,625

(22) Filed: Feb. 12, 2004

(65) Prior Publication Data

US 2004/0184349 A1 Sep. 23, 2004

(30) Foreign Application Priority Data

Feb. 19, 2003 (JP) ................................ 2003-040487

(51) Int. Cl.
*H04B 1/00* (2006.01)

(52) U.S. Cl. .......................... 381/119; 345/33; 715/727

(58) Field of Classification Search .................. 381/119, 381/61, 56, 124; 369/4; 715/727; 345/39, 345/33, 44, 46, 48, 82, 184, 170
See application file for complete search history.

(56) References Cited

U.S. PATENT DOCUMENTS 4,879,751 A 11/1989 Franks et al.
5,319,359 A * 6/1994 Zampini et al. .......... 340/815.45
5,402,501 A 3/1995 Silfvajt et al.
5,444,789 A 8/1995 Zampini
6,438,241 B1 8/2002 Silfvast et al.
6,627,829 B2 * 9/2003 Sato ............................. 200/310
6,831,657 B2 * 12/2004 Tsutsumi et al. ............ 345/589
2002/0156547 A1 10/2002 Suyama et al.

FOREIGN PATENT DOCUMENTS

EP 0 743 766 11/1996
WO WO 99/37046 7/1999

OTHER PUBLICATIONS

Quad 4, User's Manual, A Harman International Company, Jun. 5, 1998.

* cited by examiner

*Primary Examiner* — Vivian Chin
*Assistant Examiner* — Con P Tran
(74) *Attorney, Agent, or Firm* — Morrison & Foerster LLP

(57) ABSTRACT

A parameter display portion of an acoustic signal processing apparatus (mixer) according to the present invention displays a setting of a parameter (channel group setting parameter) by use of a plurality of light-emitting display elements (LED) La through Lc. While the acoustic signal processing apparatus is under operating conditions with a setting of the parameter being established through a setting operation of an operator (on-switch) Bt, the display elements La through Lc in the entire parameter-establishable range are kept in display action. The parameter display portion is controlled such that, during the display action, the display element [(2)=La, (3)=Lb, (4)=Lc] corresponding to the established setting is displayed in the first display mode, while the other display elements [(2)=Lb and Lc, (3)=La and Lc, (4)=La and Lb] excluded from the established setting being displayed in the second display mode. As a result, the present invention provides quick, reliable and easy perception of the currently setting-established part in the entire parameter-establishable range.

12 Claims, 4 Drawing Sheets

Another Display Example

Block Diagram of Hardware Configuration of Mixer

Configuration of Operating Panel (Operators and Display Portion)

Example Operation of Main Process

Example of Display Changes in Display Portion
( ○ : extinguished ● : brightly illuminated ◍ : dimly illuminated )

Another Display Example

PARAMETER DISPLAY CONTROLLER FOR AN ACOUSTIC SIGNAL PROCESSING APPARATUS

BACKGROUND OF THE INVENTION

1. Field of the Invention

The present invention is applied to an acoustic signal processing apparatus such as a digital audio mixer. In particular, the present invention relates to a parameter display controller and a parameter display computer program for controlling a parameter display portion displaying parameters indicative of operational settings by use of a plurality of display elements.

2. Description of the Related Art

Conventionally, there have been musical acoustic signal processing apparatuses such as digital audio mixers having a display panel in which input channel or output channel operators are provided with LED indicators indicative of the status of channel group assignment. Each channel operator has the LED indicators of a number equal to the number of channel groups in the vicinity thereof in order to turn on an LED indicator corresponding to a channel group to which the channel operator is currently assigned and turn off the other LED indicators corresponding to the other channel groups.

In the conventional display manner, however, it is difficult to perceive the ordinal position of the currently illuminated LED indicator among all the LED indicators because only the LED indicator for a channel group to which a channel is assigned is lit up while the LED indicators for other channel groups are extinguished. As a result, it is impossible to quickly recognize the ordinal position of the channel group to which the channel is assigned. Particularly, the conventional manner is notably inconvenient when the apparatus is used in the dark.

SUMMARY OF THE INVENTION

The present invention was accomplished to solve the above-described inconvenience, and an object thereof is to provide quick, reliable and easy recognition of the currently setting-established part in the entire parameter-establishable range of the parameter display portion displaying a parameter setting by use of a plurality of display elements.

The principal feature of the present invention is to provide a parameter display controller applied to an acoustic signal processing apparatus having a parameter display portion displaying a value of a parameter by use of a plurality of display elements, the parameter display controller comprising, a parameter setting portion for setting a value of the parameter, a first display controlling potion for energizing a part of the display elements in a first display mode, the part of display elements indicating the set value of the parameter, and a second display controlling portion for energizing the remaining display elements in a second display mode.

In this case, for example, the plurality of display elements may indicate respectively a plurality of conditions to be selected, and the parameter may represent a selected condition. Further, the acoustic signal processor may have a plurality of input and output channels assigned to any one of channel groups, the plurality of display elements may be provided for each input and output channel and may correspond to the channel groups respectively, and the parameter may be provided for each input and output channel to represent the channel group to which each input and output cannel is assigned.

The plurality of display elements may indicate the entire adjustable level, and the parameter may represent an adjusted level. Further, the acoustic signal processor may have an adjustable operator, the plurality of display elements may be disposed in the vicinity of the operator to indicate an adjusted level of the operator, and the parameter may represent the level to which the operator is adjusted.

The energizing action of the display element in the first display mode may be emphasized more than the energizing action of the display element in the second display mode. Further, the display elements may be illuminated brightly in the first display mode, while the display elements are illuminated dimly in the second display mode.

According to the present invention, the parameter display portion is adapted to display a value of a parameter by use of a plurality of display elements during operation of the apparatus. A part of the display elements is energized in a first display mode, while the remaining display elements are energized in a second display mode. As a result, since all the display elements are displayed in either of the two modes, the present invention produces a unique effect of providing easy perception of the entire parameter-settable range while also providing quick, reliable and easy recognition of the part where a value of a parameter has been set within the entire range through the use of the display elements in the first display mode. In addition, the light-emitting display elements exert a remarkable effect when the apparatus is used, particularly, in dark conditions.

The present invention may be configured and embodied not only as an invention of a device but also as an invention of a method and a computer program.

DESCRIPTION OF THE PREFERRED EMBODIMENT

[Hardware Configuration]

Figure 1:
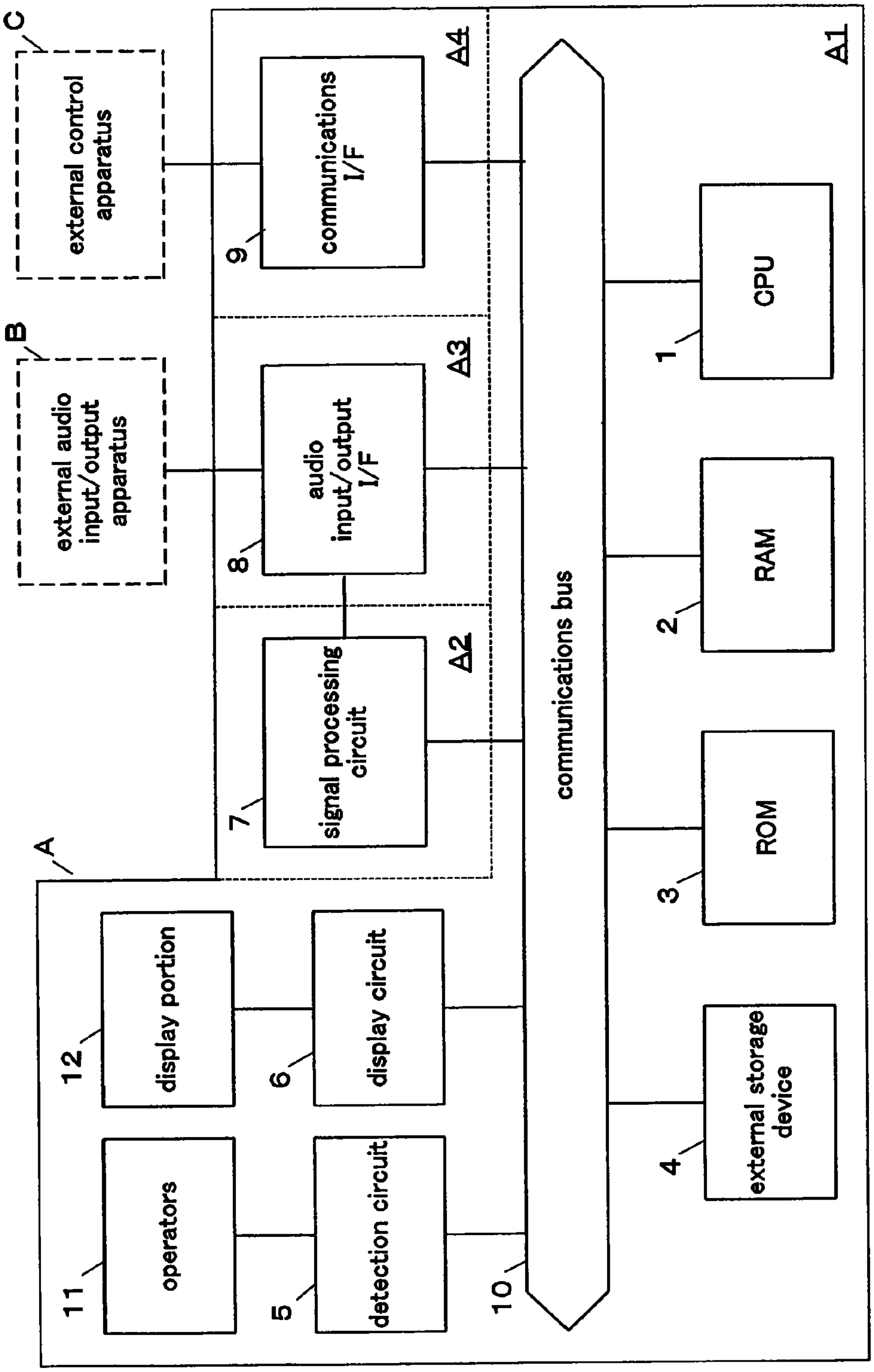
FIG. 1 is a block diagram illustrating a hardware configuration of an audio mixer to which a control system of a parameter display portion according to an embodiment of the present invention is applied.

FIG. 1 shows a block diagram illustrating a hardware configuration of a digital audio mixer to which parameter display control according to an embodiment of the present invention is applied. In FIG. 1 a digital audio mixer A has a central processing unit (CPU) 1, random access memory (RAM) 2, read-only memory (ROM) 3, external storage device 4, detection circuit 5, display circuit 6, signal processing circuit 7, audio input/output interface (I/F) 8, communications interface (I/F) 9, etc. These devices 1 through 9 are interconnected via a communications bus 10.

The CPU 1, RAM 2, ROM 3, external storage device 4, detection circuit 5 and display circuit 6 along with an operator device 11 connected to the detection circuit 5 and a display portion 12 connected to the display circuit 6 form a control section Al of the mixer A. The CPU 1 controls the whole of the mixer A in accordance with specified software programs. For example, the CPU 1 controls mixing processing performed by the signal processing circuit 7. Particularly, the CPU 1 controls the parameter display portion displaying various parameters indicative of operating status of the mixer.

In the ROM 3 there are stored specified control programs which include not only various programs for general mixing processes and processes for controlling the parameter display portion but also various tables and data accompanied with these processes. In the RAM 2 there is stored information on flags and variable data or the like utilized at these processes. Applicable as the external storage device 4 are storage media such as a hard disk (HD), compact disk read only memory (CD-ROM), flexible disk (FD), magneto-optical disk (MO), digital versatile disk (DVD) and memory card (PC card), the external storage device 4 being capable of storing various control programs and various data.

The operator device 11 contains operators (Bt, Di, Fe, etc.) such as switches, dials and faders (sliders) for mixing or establishing parameters. The operator device 11 is provided, for example, on an operating panel of the main body of the mixer A. The detection circuit 5 transmits to the display circuit 6 and signal processing circuit 7 control data such as various parameters established in accordance with user's operations operated on the operator device 11. The display portion 12 has a displayer (DP), LED indicators (La through Lc), various indicators, etc. provided on the operating panel. The display circuit 6 causes the display portion 12 to display what is derived from control data transmitted from the detection circuit 5 and communications I/F 9.

The signal processing circuit 7 is a processing circuit having a DSP engine as the dominant constituent and forms a signal processing section A2 playing a core role in signal processing performed by the mixer A. The signal processing circuit 7 processes, in accordance with setting status based on operations on the operator device 11, input audio signals for a plurality of channels transmitted from the audio input/output I/F 8 and returns processed output audio signals for the channels to the input/output I/F 8. The input/output I/F 8, which has an analog-to-digital (A/D) converter and digital-to-analog converter (D/A) and forms an input/output (I/O) section A3 of the mixer A, relays input/output audio signals for a plurality of channels between the mixer A and an external audio input/output apparatus B.

More specifically, the audio input/output I/F 8 inputs audio signals for a plurality of channels (CHs) from the external audio input/output apparatus B and transmits the input signals to the signal processing circuit 7. The signal processing circuit 7 receives control data from the detection circuit 5 and processes (mixes), in accordance with the received control data, the input audio signals received from the audio input/output I/F 8. The signal processing circuit 7 then transmits mixed output audio signals to the audio input/output I/F 8, while the audio input/output I/F 8 transmits the audio signals received from the signal processing circuit 7 to the external audio input/output apparatus B.

The communications I/F 9 forms an additional control section A4 of the mixer A, which is capable of receiving various data and control programs including control data from an external control apparatus C in order to utilize the received data and programs at the above-described signal processing. The external control apparatus C may be connected via a communications network such as a local area network (LAN), Internet or telephone lines. The above-described configuration allows the external storage device 4 (HD or CD-ROM) to store control programs and data and transmit to the RAM when the control programs are not stored in the ROM 3. In addition, the above configuration also allows the mixer A to connect via the communications network to a server computer in order to download the control programs and data from the server computer. As a result, the above configuration enables the CPU 1 to operate in a manner similar to the case where the ROM 3 stores control programs and data.

[Example Configuration of Operating Panel]

Figure 2:
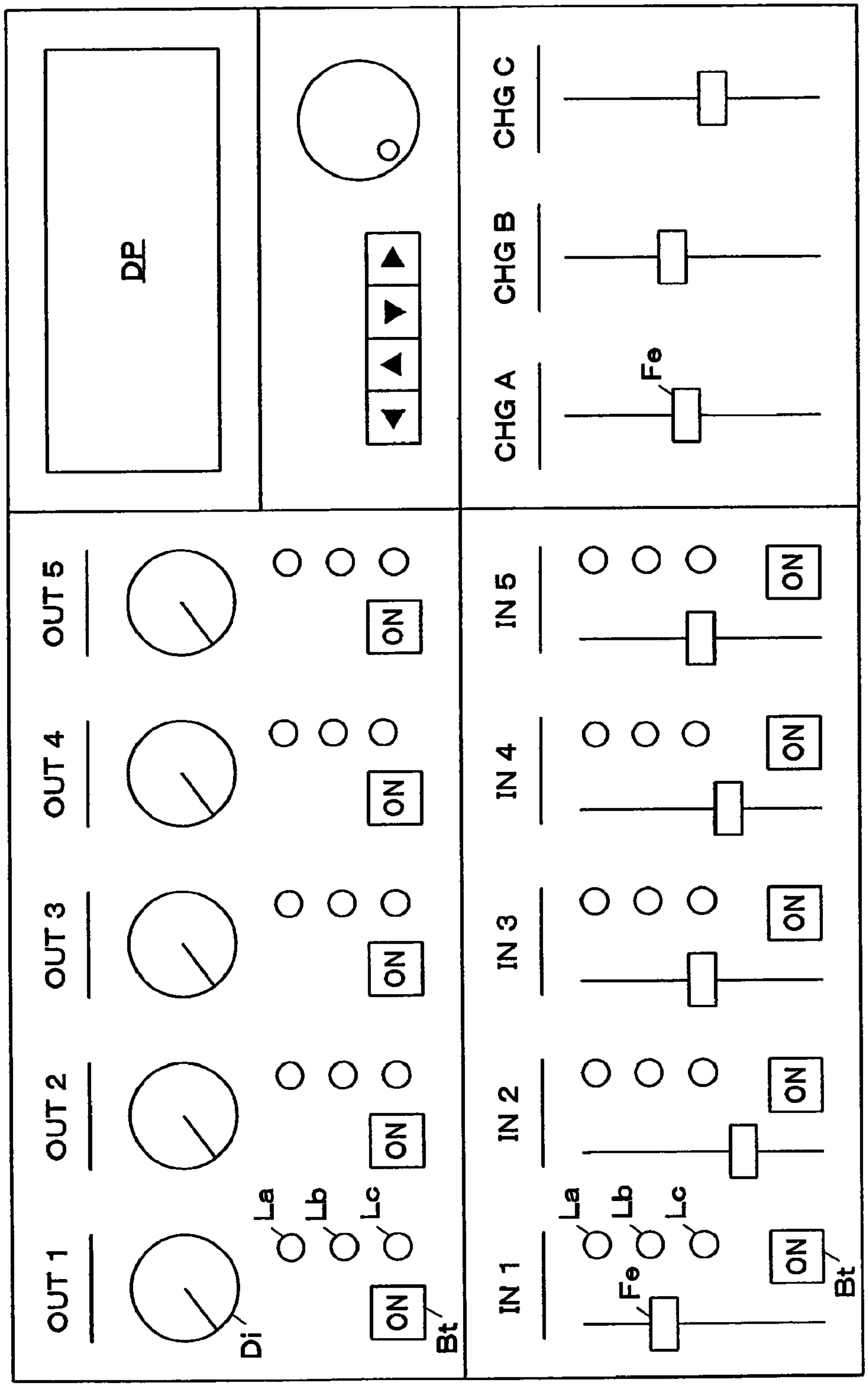
FIG. 2 is an example configuration of an operating panel (operators and a display portion) of the audio mixer according to the embodiment of the present invention.

FIG. 2 briefly illustrates an example configuration of the operating panel of the digital audio mixer according to the embodiment of the present invention. The operating panel provided in association with the control section Al of the digital audio mixer A has operators contained in the operator device 11 such as a fader (one-dimensional operation) Fe, dial (rotary operation) Di and on-switch (pushbutton operation) Bt and a plurality of display elements La through Lc contained in the display portion 12 as shown in the left side of FIG. 2. These operators and display elements are disposed for each of input channels IN1 through IN5 (lower row) and output channels OUT1 through OUT5 (upper row), while the operators and display elements for each input/output channel form input/output channel (CH) controllers 1 through 5.

As shown in the right side of FIG. 2, the operating panel is provided with not only a displayer DP for displaying/setting the entire operational status of the mixer A and operators such as direction keys and a rotary encoder (upper and middle rows) but also a channel group (CHG) controller portion (lower row). In this example, the channel group controller portion comprises a plurality ("3" in this example) of channel group controllers CHGA through CHGC, each of which is capable of concurrently changing the loudness levels of the input/output channels assigned to each of the channel groups CHGA through CHGC by operating the fader Fe provided for each channel group controller.

On the channel group controllers of the input/output channels IN1 through IN5, OUT1 through OUT5, the on-switch ("ON") Bt for switching a channel group is used for assigning the channel to a desired one of the channel groups CHGA through CHGC. Every operation of the on-switch Bt causes the channel group assignment of the channel to move to a succeeding channel group. A plurality ("3" in this example) of the display elements La through Lc provided for each of the input/output channel controllers are associated with the channel groups CHGA through CHGC, respectively. The display elements La through Lc of each input/output channel controller function as a channel group setting parameter display portion, which indicates a parameter, that is, a channel group setting parameter indicative of a channel group setting (assignment) of an input/output channel.

As the display elements La through Lc there is used a light-emitting element capable of illuminating in 2 different display modes. In this example, LED indicators are used as such a light-emitting display element. In a first display mode (illumination mode) of the 2 different modes, for example, the LED indicators La through Lc provided for the input/output channels illuminate brightly (referred to as bright illumination), while in a second display mode (illumination mode) the LED indicators La through Lc illuminate relatively in low light, that is, illuminate dimly (referred to as dim illumination).

When the assignment of a channel group has been made by operating the on-switch Bt, one indicator (e.g., La) of the LED indicators La through Lc of a given input/output channel is illuminated brightly, thereby indicating that the input/output channel is assigned to one channel group (e.g., channel group CHGA) associated with the brightly illuminated indicator of the channel groups CHGA through CHGC. At this time, the other LED indicators (e.g., Lb and Lc) are illuminated dimly in order to indicate that the input/output channel is not assigned to the channel groups (e.g., channel groups CHGB and CHGC) associated with the dimly illuminated indicators. As a result, all the LED indicators La through Lc are illuminated either brightly or dimly so as to exhibit the entire range of all the assignable channel groups CHGA through CHGC.

[Control of Parameter Display Portion]

Figure 3:
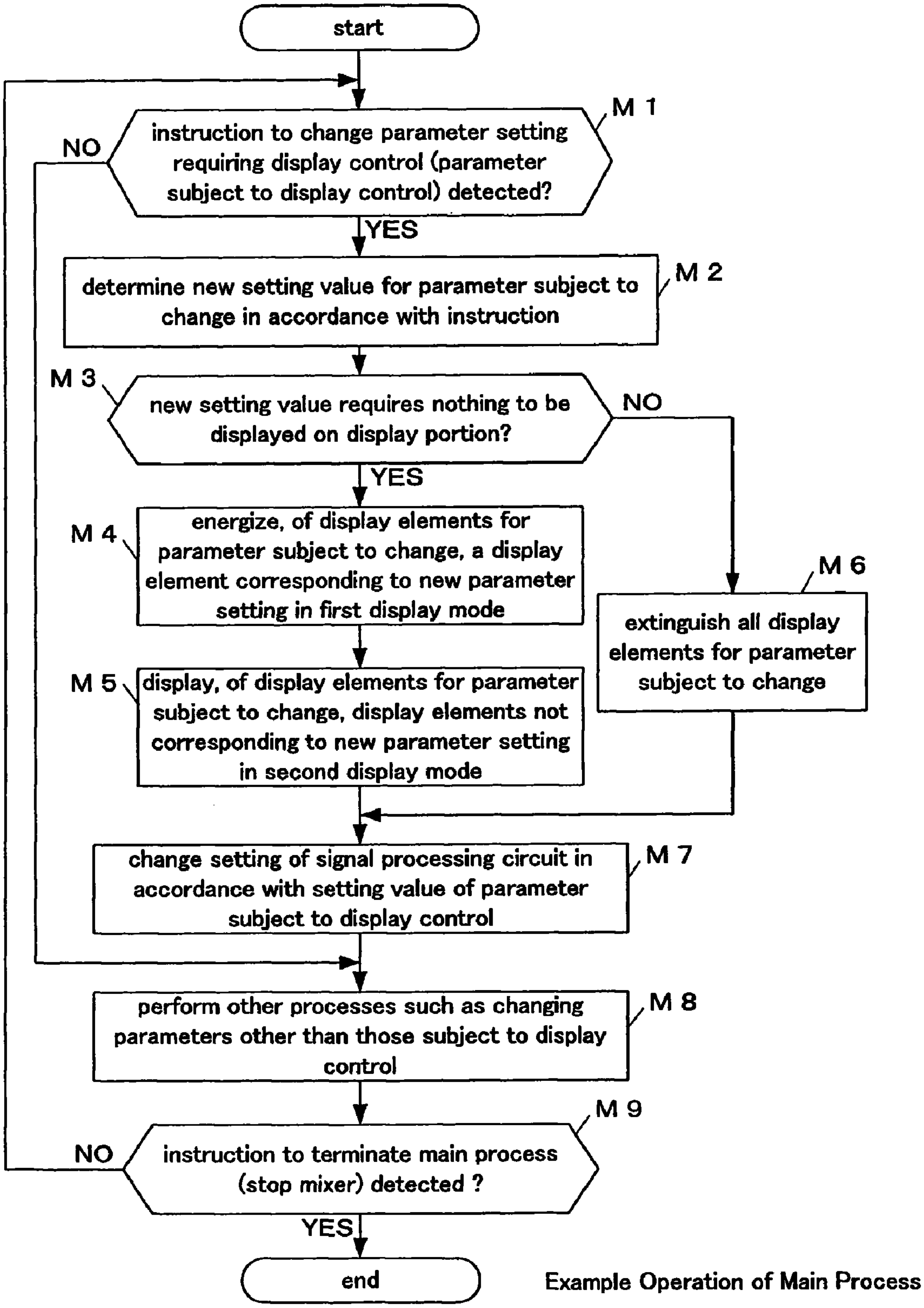
FIG. 3 is a flowchart illustrating example operations done in a main process according to the embodiment of the present invention.

FIG. 3 is a flowchart illustrating an example operation done in a main process regarding the control of the parameter display portion according to the embodiment of the present invention. After the process has been initiated, it is determined whether there is detected an instruction to change the setting of a parameter subject to display control (step M1). The parameter subject to display control refers to a parameter for which the control over display is required, that is, the parameter whose setting is presented by use of the display elements La through Lc. As a representative example of the parameter subject to display control, the example shown in FIG. 2 illustrates the channel group setting parameters indicative of the current assignment of the channel group (CHG). In this example, in order to detect an "instruction to change", it is determined whether the on-switch Bt for changing a channel group setting has been operated. Hereinafter, descriptions fit into the example of FIG. 2 will be added in brackets "[ ]" as necessary.

When such an "instruction to change" [Bt operation] has been detected (M1=YES), a new setting value [channel group assignment] indicated by the instruction for the parameter subject to the change [channel group setting parameter] is determined (step M2). It is then determined whether the new setting value requires nothing to be displayed on the parameter display portion [channel group setting parameter display portion] or not (step M3).

When it is determined that the new setting value [e.g., channel group CHGB] has to be displayed on the parameter display portion (M3=YES), the display element [Lb] corresponding to the new setting value [channel group CHGB] of the display portion for the parameter subject to the change [channel group setting parameter display portion] is illuminated (or energized) in the first display mode (method) (step M4). Of the display portion for the parameter subject to the change, in addition, the other display elements [La and Lc] which do not correspond to the new setting value [channel group CHGB] are illuminated (or energized) in the second display mode (step M5).

On the other hand, when it is determined that the new setting value [channel group assignment canceled] does not have to be displayed on the parameter display portion (M3=NO), all the display elements [La through Lc] comprising the display portion for the parameter subject to the change are extinguished (step M6). After the process of illuminating (or energizing) or extinguishing the display elements (M5, M6), there is changed a setting of the signal processing circuit 7 in accordance with the setting value of the parameter subject to display control (step M7).

When there has not been detected an instruction to change the setting of a parameter subject to display control (M1=NO), or after the process for changing the setting of the signal processing circuit 7 (M7), other processes such as changing parameters other than those subject to display control are performed as necessary (step M8). Then it is determined whether there is detected an instruction to terminate the main process (to stop the mixer) (step M9). When the terminating instruction is not given (M9=NO), the CPU 1 returns to the step (M1) for detecting an instruction to change the setting of a parameter subject to display control and repeats the above-described processes (M1 through M9) until the terminating instruction is given. If the terminating instruction is given (M9=YES), the main process is terminated.

Figure 4:
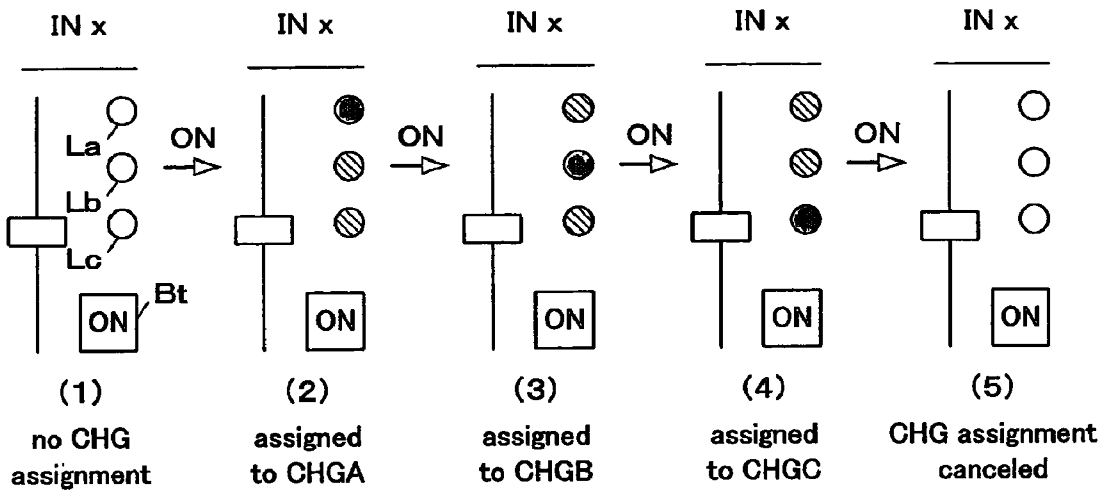
FIG. 4 is a diagram illustrating an example showing display changes in the display portion according to the embodiment of the present invention.

FIG. 4 is a diagram illustrating an example of display changes in the display portion according to the embodiment of the present invention. FIG. 4 illustrates transitions in which the display mode of the LED indicators La through Lc on the channel group setting parameter display portion is changed, the transitions being generated at a case where when the on-switch Bt of an input channel controller x (x=1 through 5) for any given input channel INx is operated in FIG. 2, the channel assignment for the input channel INx is changed by following the process flows of FIG. 3. The blank, solidly shaded and diagonally shaded LED indicators La through Lc in FIG. 4 indicate extinction, bright illumination (full illumination) and dim illumination, respectively.

FIG. 4(1) illustrates a state where no channel group (CHG) assignment is made for the input channel INx, resulting in all the LED indicators La through Lc of the channel group setting parameter display portion being extinguished. If the on-switch Bt is operated at this time (M1=YES), the channel INx is first assigned to the channel group CHGA (M2) as shown in FIG. 4(2), resulting in the LED indicator La being illuminated brightly (M4) with the other LED indicators Lb and Lc illuminated dimly (M5). The brightly illuminated LED indicator La indicates that the channel INx is currently assigned to the channel group CHGA. At this time, the setting of the signal processing circuit 7 is changed so as to enable the controller of the channel group CHGA to adjust the loudness level.

With each additional operation of the on-switch Bt (M1=YES) following the above on-switch operation, as shown in FIGS. 4(3) and (4), the assignment of the channel group INx is switched in orderly fashion to the channel group CHGB or CHGC (M2), resulting in the display element Lb or Lc being illuminated brightly (M4) with the other LED indicators La and Lc, or La and Lb illuminated dimly (M5). The brightly illuminated display element Lb or Lc indicates that the controller of the channel group CHGB or CHGC is capable of level-adjusting. When the on-switch Bt is operated at a state where the display element Lc corresponding to the last channel group CHGC is illuminated brightly, the channel group assignment of the channel INx is canceled (M2) as shown in FIG. 4(5), resulting in all the display elements La through Lc being reset to the original extinction state (M3=NO→M6).

[Another Embodiment]

Figure 5:
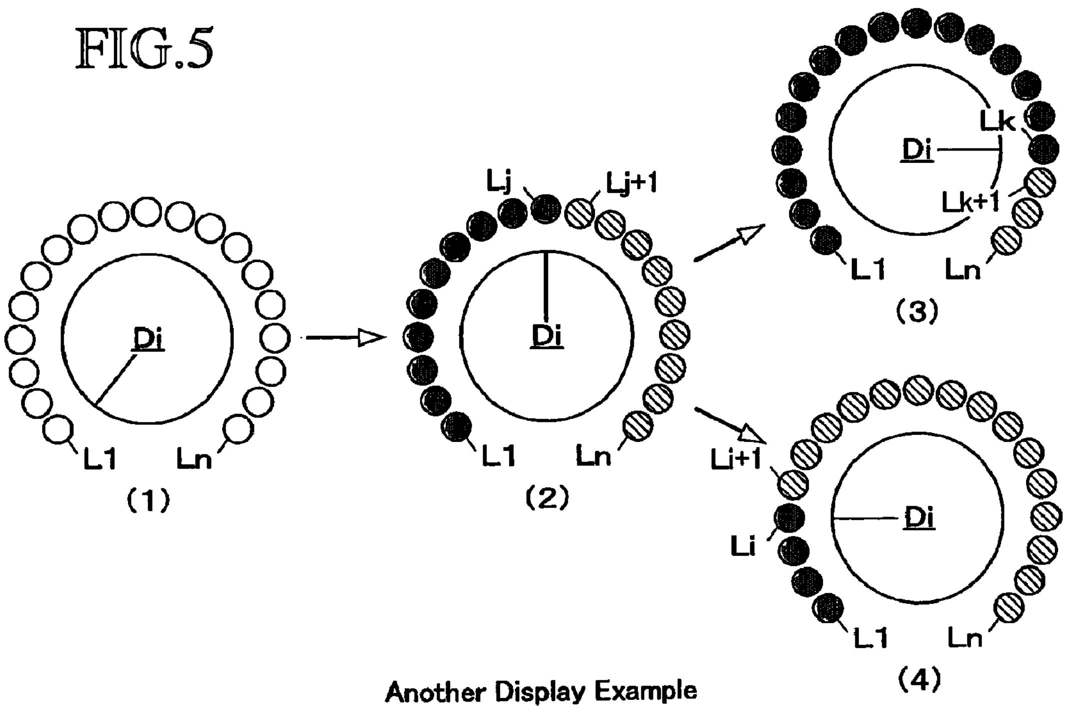
FIG. 5 is a diagram illustrating another example display of the display portion according to an embodiment of the present invention.

The parameters subject to display control in the example of FIG. 4 are the channel group setting parameters, but may be other parameters as far as the set values of the parameters are presented by use of a plurality of display elements. As shown in FIG. 5, for example, the parameter subject to display control may be applied to a parameter display portion in which the parameter is used in order to set a level such as loudness. In FIG. 5 where a multiplicity of the LED indicators L1 through Ln are disposed in the circumferential vicinity of the level-adjusting dial Di, on the occasion of setting a level through the operation of the dial Di, the level established in accordance with the dial position is represented by the brightly illuminated LED indicators, while the other LED indicators being illuminated dimly. That is to say, since all the LED indicators are turned on in either bright illumination or dim illumination, the entire adjustable level range can be recognized by users. More specifically, the brightly illuminated LED indicators exhibit the current setting level, while the other dimly illuminated LED indicators represent the remaining adjustable range.

For example, in a state where the dial Di is positioned in zero in order to set a level at “zero” with all the LED indicators being extinguished as shown in FIG. 5(1), if the dial Di is turned to the middle position as shown in FIG. 5(2) (M1=YES in FIG. 3), the level is set so as to correspond with the middle position (M2) with the LED indicators L1 through Lj disposed from zero to the middle corresponding to the set level being illuminated brightly (M4) and the remaining LED indicators Lj+1 through Ln being illuminated dimly (M5). Then, if the dial Di is further turned to a given position in the zero or maximum direction as shown in FIG. 5(3) or (4) (M1=YES), the level is set so as to correspond with the position where the dial has been further turned (M2) with the LED indicators L1 through Lk or L1 through Li (Li<Lj<Lk), corresponding to the established level and ranging from zero to the position pointed by the dial, being illuminated brightly (M4) and the other LED indicators Lk+1 through Ln or Li+1 through Ln being illuminated dimly (M5).

[Various Embodiments]

The preferred embodiments of the present invention have been described above, with reference to the accompanying drawings being made. However, it will be understood that various modifications may be made in the present invention and the present invention may be variously embodied without departing from the spirit and scope of the invention.

For example, although the above embodiment employs the on-switch Bt as a method for changing a value of a parameter subject to display control (for selecting a different option), the method is not limited to the button-type switch operation. More specifically, other methods are applicable as far as they are capable of changing a value of a parameter. Examples of the applicable methods include a method for changing a value of a parameter by reading out data capable of changing the entire settings of the panel and a method for changing a value of a parameter by receiving control data from the external control apparatus C in order to establish a different setting which is contained in the control data.

The applicable display modes (methods) of the parameters subject to display control are not limited to those described in the embodiments. More specifically, other modes (methods) may be applicable as far as, of a plurality of display elements, a display element/elements falling within the range of an established setting is/are illuminated (or energized) in the first display mode (method) by which the display element/elements is/are emphasized in order to gain more prominence than those illuminated (or energized) in the second display mode (method) while the remaining display elements excluded from the setting range are illuminated (or energized) in the second display mode by which the remaining display elements are illuminated (or energized) darker than the first display mode but distinguishable from extinction. Using two different display modes of bright and dim illuminations as applied to the embodiments is one preferred method, providing easy perception of established settings. However, other methods are also applicable such as using two different colors and using two different flashing (including lighting) manners for two different display modes. Furthermore, applicable display elements of the display portion are not limited to LEDs but may be those having a light-emitting capability which are capable of representing an established setting by lighting, extinguishing, flashing or the like.

What is claimed is:

1. A parameter display controller applied to an acoustic signal processing apparatus having a parameter display portion displaying a value of a parameter by use of a plurality of display elements of the acoustic signal processing apparatus, said parameter display controller comprising:

a parameter setting portion for setting a value of the parameter within a first range of parameter values, wherein the first range includes an extinguishing value;

a first display controlling portion for energizing all of the display elements of said plurality of display elements of the acoustic signal processing apparatus when the value set by the parameter setting portion is any value within the first range of parameter values except the extinguishing value of the first range, at least one of the energized display elements of said plurality of display elements of the acoustic signal processing apparatus being illuminated brightly in a first display mode, said at least one of the energized display elements illuminated brightly in the first display mode representing a second range of parameter values from the extinguishing value up to and including the set value, and the remaining energized display elements of said plurality of display elements of the acoustic signal processing apparatus being illuminated dimly in a second display mode different from the first display mode;

and a second display controlling portion for extinguishing all of the display elements of said plurality of display elements of the acoustic signal processing apparatus when the set value of the parameter is the extinguishing value.

2. A parameter display controller according to claim 1, wherein said plurality of display elements indicate the entire adjustable level, and said parameter represents an adjusted level.

3. A parameter display controller according to claim 1, wherein said acoustic signal processing apparatus has an adjustable operator, said plurality of display elements are disposed in the vicinity of the operator to indicate an adjusted level of the operator, and said parameter represents the level to which the operator is adjusted.

4. A parameter display controller according to claim 1, wherein the energizing action of said at least one of the energized display elements in the first display mode is emphasized more than the energizing action of said remaining energized display elements in the second display mode.

5. A parameter display controller according to claim 1 wherein the plurality of display elements are light emitting diodes.

6. A parameter display controller according to claim 1 wherein the parameter setting portion for setting a value of a parameter comprises setting a volume level.

7. A parameter display method applied to an acoustic signal processing apparatus having a parameter display portion displaying a value of a parameter by use of a plurality of display elements of the acoustic signal processing apparatus, said parameter display method including:

a parameter setting step for setting a value of the parameter within a first range of parameter values, wherein the first range includes an extinguishing value;

a first display controlling step for energizing all of the display elements of said plurality of display elements of the acoustic signal processing apparatus when the value set by the parameter setting portion is any value within the first range of parameter values except the extinguishing value of the first range, at least one of the energized display elements of said plurality of display elements of the acoustic signal processing apparatus being illuminated brightly in a first display mode, said at least one of the energized display elements illuminated brightly in the first display mode representing a second range of parameter values from the extinguishing value up to and including the set value, and the remaining energized display elements of said plurality of display elements of the acoustic signal processing apparatus being illuminated dimly in a second display mode different from the first display mode; and a second display controlling step for extinguishing all of the display elements of said plurality of display elements of the acoustic signal processing apparatus when the set value of the parameter is the extinguishing value.

8. A parameter display method according to claim 7, further comprising:

indicating the entire adjustable level using said plurality of display elements, and said parameter representing an adjusted level.

9. A parameter display method according to claim 7, further comprising:

providing an adjustable operator, providing said plurality of display elements in the vicinity of the operator to indicate an adjusted level of the operator, and said parameter representing the level to which the operator is adjusted.

10. A parameter display method according to claim 7, further comprising:

emphasizing the energizing action of said at least one of the energized display elements in the first display mode more than the energizing action of said remaining energized display elements in the second display mode.

11. A parameter display method according to claim 7 wherein the plurality of display elements are light emitting diodes.

12. A parameter display method according to claim 7 wherein the parameter setting step for setting a value of a parameter comprises setting a volume level.

* * * * *